United States Patent
Zhou et al.

(10) Patent No.: US 10,514,802 B2
(45) Date of Patent: *Dec. 24, 2019

(54) METHOD FOR CONTROLLING DISPLAY OF TOUCHSCREEN, AND MOBILE DEVICE

(71) Applicant: Huawei Device Co., Ltd., Dongguan, Guangdong (CN)

(72) Inventors: Jinfeng Zhou, Dongguan (CN); Yukun Guo, Beijing (CN); Wei Zhang, Beijing (CN); Zhengquan Wang, Dongguan (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,792

(22) Filed: Dec. 21, 2018

(65) Prior Publication Data

US 2019/0121492 A1 Apr. 25, 2019

Related U.S. Application Data

(63) Continuation of application No. 16/014,168, filed on Jun. 21, 2018, now Pat. No. 10,185,442, which is a (Continued)

(51) Int. Cl.
*G06F 3/041* (2006.01)
*G06F 3/0488* (2013.01)

(52) U.S. Cl.
CPC .......... *G06F 3/0416* (2013.01); *G06F 3/0412* (2013.01); *G06F 3/0488* (2013.01); (Continued)

(58) Field of Classification Search
CPC .... G06F 3/0488; G06F 3/04883; G06F 3/041; G06F 3/0412; G06F 3/0416; G06F 2203/04806; G06F 2203/04808
See application file for complete search history.

(56) References Cited

U.S. PATENT DOCUMENTS

| 7,538,760 B2 | 5/2009 | Hotelling et al. |
| 7,846,786 B2 | 12/2010 | Lee et al. |

(Continued)

FOREIGN PATENT DOCUMENTS

| CN | 102112952 A | 6/2011 |
| CN | 102541319 A | 7/2012 |

(Continued)

OTHER PUBLICATIONS

Machine Translation and Abstract of Chinese Publication No. CN102541319, Jul. 4, 2012, 16 pages.

(Continued)

*Primary Examiner* — Vijay Shankar
(74) *Attorney, Agent, or Firm* — Conley Rose, P.C.

(57) ABSTRACT

A method for controlling display of a touchscreen, and a mobile device are presented, which relate to the field of electronic device technologies, so that the mobile device can control to zoom-in or zoom-out displayed content on the touchscreen according to received information about two touches. The method in the present disclosure includes receiving first touch information, where the first touch information comprises a first touch position; receiving second touch information, where the second touch information comprises a second touch position; determining zooming times according to a distance between the first touch position and the second touch position; and zooming displayed content on the touchscreen according to a position relationship between the first touch position and the second touch position and the zooming times. The present disclosure is applicable to a mobile device.

20 Claims, 7 Drawing Sheets

Related U.S. Application Data continuation of application No. 15/101,531, filed as application No. PCT/CN2013/088690 on Dec. 5, 2013, now Pat. No. 10,025,420.

(52) U.S. Cl.
CPC .................. *G06F 3/04883* (2013.01); *G06F 2203/04806* (2013.01); *G06F 2203/04808* (2013.01)

(56) References Cited

U.S. PATENT DOCUMENTS

| | | |
|---|---|---|
| 7,849,424 B2 | 12/2010 | Wolk et al. |
| 8,094,247 B2 | 1/2012 | Allemand et al. |
| 9,182,859 B2 | 11/2015 | Coulson et al. |
| 10,025,420 B2* | 7/2018 | Zhou ................ G06F 3/0488 |
| 10,185,442 B2* | 1/2019 | Zhou ................ G06F 3/0488 |
| 2010/0053111 A1 | 3/2010 | Karlsson |
| 2013/0176245 A1 | 7/2013 | Kwon |
| 2013/0222313 A1 | 8/2013 | Nakamura et al. |
| 2013/0300710 A1 | 11/2013 | Cho et al. |

FOREIGN PATENT DOCUMENTS

| | | |
|---|---|---|
| CN | 103155534 A | 6/2013 |
| CN | 103294353 A | 9/2013 |
| CN | 103425426 A | 12/2013 |

OTHER PUBLICATIONS

Foreign Communication From a Counterpart Application, PCT Application No. PCT/CN2013/088690, International Search Report dated Sep. 11, 2014, 2 pages.

Foreign Communication From a Counterpart Application, PCT Application No. PCT/CN2013/088690, Written Opinion dated Sep. 11, 2014, 8 pages.

* cited by examiner

METHOD FOR CONTROLLING DISPLAY OF TOUCHSCREEN, AND MOBILE DEVICE

CROSS-REFERENCE TO RELATED APPLICATIONS

This application is a continuation of U.S. patent application Ser. No. 16/014,168, filed on Jun. 21, 2018, the U.S. patent application Ser. No. 16/014,168 is a continuation of U.S. patent application Ser. No. 15/101,531, filed on Jun. 3, 2016, now U.S. Pat. No. 10,025,420, the U.S. patent application Ser. No. 15/101,531 is a National Stage of International Application No. PCT/CN2013/088690, filed on Dec. 5, 2013. All of the aforementioned patent applications are hereby incorporated by reference in their entireties.

TECHNICAL FIELD

The present disclosure relates to the field of mobile device technologies, and in particular, to a method for controlling display of a touchscreen, and a mobile device.

BACKGROUND

At present, more mobile devices (such as a mobile phone and a tablet computer) use a touchscreen, and when using these mobile devices to view content such as an image, or a map, people often need to zoom-in or zoom-out the content to facilitate viewing. When people need a mobile device to perform a zoom-in or zoom-out function, a method generally used is placing two fingers on a touch-control touchscreen, so that the mobile device simultaneously receives signals from two touch points; zooming in or zooming out content displayed on the touchscreen according to changes in signal movement directions of the two touch points; and controlling zoom-in or zoom-out times using a signal movement distance of the two touch points.

The prior art has at least the following disadvantages. In the foregoing solution, using changes of the simultaneously received signals of the two touch points, the mobile device controls to zoom-in or zoom-out the content displayed on the touchscreen and the zoom in or zoom out times. However, when controlling to zoom-in or zoom-out the content displayed on the touchscreen, the mobile device needs to simultaneously receive the signals from the two touch points and detect change status of the two signals, and a processing process is complex, which reduces working efficiency of the mobile device.

SUMMARY

Embodiments of the present disclosure provide a method for controlling display of a touchscreen, and a mobile device, which can resolve a problem that a processing process is complex, and working efficiency is reduced when the mobile device controls to zoom-in or zoom-out displayed content on the touchscreen.

To achieve the foregoing objective, the following technical solutions are provided in the embodiments of the present disclosure.

According to a first aspect, an embodiment of the present disclosure provides a method for controlling display of a touchscreen of a mobile device, including receiving first touch information, where the first touch information includes a first touch position; receiving second touch information, where the second touch information includes a second touch position; determining zooming times according to a distance between the first touch position and the second touch position; and zooming displayed content on the touchscreen according to a position relationship between the first touch position and the second touch position and the zooming times.

With reference to the first aspect, in a first possible implementation manner of the first aspect, before the receiving second touch information, the method further includes dividing a display area of the touchscreen into a first display area and a second display area according to the first touch position, where a boundary between the first display area and the second display area passes the first touch position; or dividing a display area of the touchscreen into four quadrants using the first touch position as an origin, where two quadrants in the four quadrants serve respectively as the first display area and the second display area; and the zooming displayed content on the touchscreen according to a position relationship between the first touch position and the second touch position and the zooming times includes, when the second touch position is located in the first display area, zooming in the displayed content on the touchscreen according to the position relationship; or when the second touch position is located in the second display area, zooming out the displayed content on the touchscreen according to the position relationship.

With reference to the first aspect, in a second possible implementation manner of the first aspect, the zooming displayed content on the touchscreen according to a position relationship between the first touch position and the second touch position and the zooming times further includes determining a first difference and a second difference according to coordinates of the first touch position and coordinates of the second touch position, where the first difference is a difference between a horizontal coordinate of the first touch position and a horizontal coordinate of the second touch position, and the second difference is a difference between a vertical coordinate of the first touch position and a vertical coordinate of the second touch position; and zooming the displayed content on the touchscreen according to the first difference, the second difference, and the zooming times.

With reference to the second possible implementation manner of the first aspect, in a third possible implementation manner of the first aspect, the method includes, when both the first difference and the second difference are positive, zooming in the displayed content on the touchscreen; or when both the first difference and the second difference are negative, zooming out the displayed content on the touchscreen; or when both the first difference and the second difference are negative, zooming in the displayed content on the touchscreen; or when both the first difference and the second difference are positive, zooming out the displayed content on the touchscreen.

With reference to the second possible implementation manner of the first aspect, in a fourth possible implementation manner of the first aspect, the method includes, when the first difference is positive and the second difference is negative, zooming in the displayed content on the touchscreen; or when the first difference is negative and the second difference is positive, zooming out the displayed content on the touchscreen; or when the first difference is negative and the second difference is positive, zooming in the displayed content on the touchscreen; or when the first difference is positive and the second difference is negative, zooming out the displayed content on the touchscreen.

With reference to the first possible implementation manner of the first aspect or the second possible implementation manner of the first aspect, in a fifth possible implementation manner of the first aspect, the zooming displayed content on the touchscreen according to a position relationship between the first touch position and the second touch position and the zooming times includes wholly zooming in the displayed content on the touchscreen; or partially zooming in the displayed content on the touchscreen.

With reference to the fifth possible implementation manner of the first aspect, in a sixth possible implementation manner of the first aspect, the zooming the displayed content on the touchscreen in part includes zooming in or zooming out a circular display area that uses the first touch position or the second touch position as a center and uses a preset length as a radius; or zooming a display area of a closed graph that uses the first touch position or the second touch position as a center and uses a preset length as a circumference.

With reference to the first aspect or any possible implementation manner of the first aspect, in a seventh possible implementation manner of the first aspect, the determining zooming times according to a distance between the first touch position and the second touch position includes determining the distance according to the coordinates of the first touch position and the coordinates of the second touch position; and determining a ratio of the distance to a preset distance, and determining the ratio as the zooming times, where the distance is greater than or equal to the preset distance; or directly determining the zooming times according to the distance, where a correspondence between the distance and the zooming times is preset.

With reference to the seventh possible implementation manner of the first aspect, in an eighth possible implementation manner of the first aspect, the preset distance is a minimum distance for distinguishing the first touch position and the second touch position as two different positions.

With reference to the first aspect or any possible implementation manner of the first aspect, in a ninth possible implementation manner of the first aspect, a time interval between a moment for receiving the first touch information and a moment for receiving the second touch information is less than a preset time.

According to a second aspect, an embodiment of the present disclosure provides a mobile device, including a receiving unit configured to receive first touch information, where the first touch information includes a first touch position; where the receiving unit is further configured to receive second touch information, where the second touch information includes a second touch position; a determining unit configured to determine zooming times according to a distance between the first touch position and the second touch position; and a zooming unit configured to zoom displayed content on the touchscreen according to a position relationship between the first touch position and the second touch position and the zooming times.

With reference to the second aspect, in a first possible implementation manner of the second aspect, the mobile device further includes a dividing unit configured to divide a display area of the touchscreen into a first display area and a second display area according to the first touch position, where a boundary between the first display area and the second display area passes the first touch position; or the dividing unit, further configured to divide a display area of the touchscreen into four quadrants using the first touch position as an origin, where two quadrants in the four quadrants serve respectively as the first display area and the second display area; and the zooming unit is configured to, when the second touch position is located in the first display area, zoom-in the displayed content on the touchscreen according to the position relationship; or when the second touch position is located in the second display area, zoom-out the displayed content on the touchscreen according to the position relationship.

With reference to the second aspect, in a second possible implementation manner of the second aspect, the zooming unit includes a difference determining subunit configured to determine a first difference and a second difference according to coordinates of the first touch position and coordinates of the second touch position, where the first difference is a difference between a horizontal coordinate of the first touch position and a horizontal coordinate of the second touch position, and the second difference is a difference between a vertical coordinate of the first touch position and a vertical coordinate of the second touch position; and a zooming subunit configured to zoom the displayed content on the touchscreen according to the first difference, the second difference, and the zooming times.

With reference to the second possible implementation manner of the second aspect, in a third possible implementation manner of the second aspect, the zooming subunit is configured to, when both the first difference and the second difference are positive, zoom-in the displayed content on the touchscreen; or when both the first difference and the second difference are negative, zoom-out the displayed content on the touchscreen; or when both the first difference and the second difference are negative, zoom-in the displayed content on the touchscreen; or when both the first difference and the second difference are positive, zoom-out the displayed content on the touchscreen.

With reference to the second possible implementation manner of the second aspect, in a fourth possible implementation manner of the second aspect, the zooming subunit is configured to, when the first difference is positive and the second difference is negative, zoom-in the displayed content on the touchscreen; or when the first difference is negative and the second difference is positive, zoom-out the displayed content on the touchscreen; or when the first difference is negative and the second difference is positive, zoom-in the displayed content on the touchscreen; or when the first difference is positive and the second difference is negative, zoom-out the displayed content on the touchscreen.

With reference to the first possible implementation manner of the second aspect or the second possible implementation manner of the second aspect, in a fifth possible implementation manner of the second aspect, the zooming unit further includes a whole zooming subunit configured to wholly zoom-in the displayed content on the touchscreen; or a part zooming subunit configured to partially zoom-in the displayed content on the touchscreen.

With reference to the fifth possible implementation manner of the second aspect, in a sixth possible implementation manner of the second aspect, the part zooming subunit is configured to zoom-in or zoom out a circular display area that uses the first touch position or the second touch position as a center and uses a preset length as a radius; or zoom a display area of a closed graph that uses the first touch position or the second touch position as a center and uses a preset length as a circumference.

With reference to the second aspect or any possible implementation manner of the second aspect, in a seventh possible implementation manner of the second aspect, the determining unit includes a distance determining subunit configured to determine the distance according to the coordinates of the first touch position and the coordinates of the second touch position; and a times determining subunit configured to determine a ratio of the distance to a preset distance, and determine the ratio as the zooming times, where the distance is greater than or equal to the preset distance; or the times determining subunit, further configured to directly determine the zooming times according to the distance, where a correspondence between the distance and the zooming times is preset.

With reference to the seventh possible implementation manner of the second aspect, in an eighth possible implementation manner of the second aspect, the preset distance is a minimum distance for distinguishing the first touch position and the second touch position as two different positions.

With reference to the second aspect or any possible implementation manner of the second aspect, in a ninth possible implementation manner of the second aspect, a time interval between a moment for receiving the first touch information and a moment for receiving the second touch information is less than a preset time.

With reference to the second aspect, in a tenth possible implementation manner of the second aspect, the mobile device includes a display unit configured to display the displayed content that is zoomed by the zooming unit.

In the prior art, when a mobile device controls to zoom-in or zoom-out displayed content on a touchscreen, a processing process is complex, and a reaction rate and working efficiency are reduced. Compared with the prior art, embodiments of the present disclosure provide a method for controlling display of a touchscreen, and a mobile device; in the present disclosure, the mobile device receives information about two touches of a user, and obtains positions of the two touches; determines to zoom the displayed content on the touchscreen according to the positions of the two touches, and determines zoom in or zoom out times according to a distance between the positions of the two touches. In this way, the mobile device only needs to sequentially receive signals of the positions of the two touches to complete zooming control on the displayed content on the touchscreen. Operations are convenient, and the processing process is simple, which increases the working efficiency of the mobile device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms used in the embodiments of the present disclosure are merely for a purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

It should be understood that, although the terms, such as "first", "second", and "third" may be used in the embodiments of the present disclosure to describe touch information, a touch position, and a display area, the touch information, the touch position, and the display area should not be limited by these terms. These terms are merely used to differentiate the touch information, the touch position, and the display area. For example, without departing from a scope of the embodiments of the present disclosure, a first display area may also be referred to as a second display area, and similarly a second display area may also be referred to as a first display area.

Depending on the context, as used herein, the word "at the time of . . . " or "when . . . " may be construed as "if". Similarly, depending on the context, the phrase "when determining" may be construed as "if it is determined".

Figure 1:
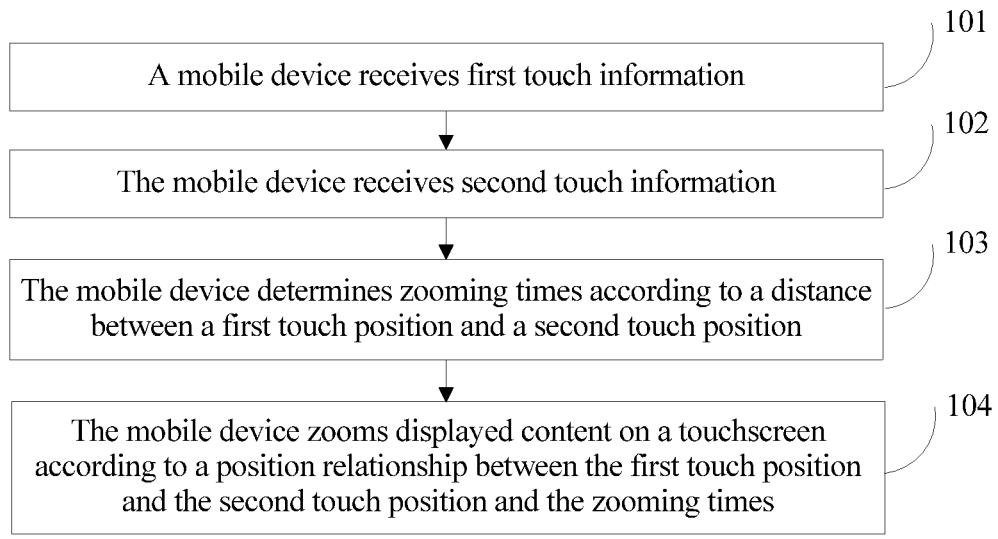
FIG. 1 is a flowchart of a method according to an embodiment of the present disclosure.

An embodiment of the present disclosure provides a method for controlling display of a touchscreen of a mobile device, which is used in a mobile device; as shown in FIG. 1, the method includes the following steps:

101. The mobile device receives first touch information.

The mobile device receives the first touch information according to a touch instruction of a user, where the first touch information includes a first touch position.

102. The mobile device receives second touch information.

The second touch information includes a second touch position. The mobile device divides a display area of the touchscreen into a first display area and a second display area according to the first touch position, where a boundary between the first display area and the second display area passes the first touch position; or the mobile device divides a display area of the touchscreen into four quadrants using the first touch position as an origin, where two quadrants in the four quadrants serve respectively as a first display area and a second display area.

103. The mobile device determines zooming times according to a distance between a first touch position and a second touch position.

The mobile device determines the distance between the first touch position and the second touch position according to coordinates of the first touch position and coordinates of the second touch position; and then determines a ratio of the distance between the first touch position and the second touch position to a preset distance, and determines the ratio as the zooming times, where the distance between the first touch position and the second touch position is greater than or equal to the preset distance; or directly determines the zooming times according to the distance between the first touch position and the second touch position, where a correspondence between the distance between the first touch position and the second touch position and the zooming times is preset. The preset distance is a minimum distance for distinguishing the first touch position and the second touch position as two different positions.

104. The mobile device zooms displayed content on a touchscreen according to a position relationship between the first touch position and the second touch position and the zooming times.

Zooming the displayed content on the touchscreen means to zoom-in or zoom-out the displayed content on the touchscreen. When the second touch position is located in the first display area, the displayed content on the touchscreen is zoomed in according to the position relationship; or when the second touch position is located in the second display area, the displayed content on the touchscreen is zoomed out according to the position relationship.

Optionally, the mobile device determines a first difference and a second difference according to the coordinates of the first touch position and the coordinates of the second touch position, where the first difference is a difference between a horizontal coordinate of the first touch position and a horizontal coordinate of the second touch position, and the second difference is a difference between a vertical coordinate of the first touch position and a vertical coordinate of the second touch position; and zooms the displayed content on the touchscreen according to the first difference, the second difference, and the zooming times, where a specific process is described as follows: when both the first difference and the second difference are positive, zooming in the displayed content on the touchscreen; or when both the first difference and the second difference are negative, zooming out the displayed content on the touchscreen; or when both the first difference and the second difference are negative, zooming in the displayed content on the touchscreen; or when both the first difference and the second difference are positive, zooming out the displayed content on the touchscreen; or when the first difference is positive and the second difference is negative, zooming in the displayed content on the touchscreen; or when the first difference is negative and the second difference is positive, zooming out the displayed content on the touchscreen; or when the first difference is negative and the second difference is positive, zooming in the displayed content on the touchscreen; or when the first difference is positive and the second difference is negative, zooming out the displayed content on the touchscreen.

Optionally, that the mobile device zooms displayed content on a touchscreen includes wholly zooming in the displayed content on the touchscreen, or partially zooming in the displayed content on the touchscreen. The zooming the displayed content on the touchscreen in part may be zooming a circular display area that uses the first touch position or the second touch position as a center and uses a preset length as a radius or zooming a display area of a closed graph that uses the first touch position or the second touch position as a center and uses a preset length as a circumference.

It should be noted that, a time interval between a moment for receiving the first touch information by the mobile device and a moment for receiving the second touch information by the mobile device is less than a preset time.

In the prior art, a mobile device needs to simultaneously receive signals of two touch points, and detect change status of the two signals to control to zoom-in or zoom-out displayed content on a touchscreen. Compared with the prior art, in this embodiment of the present disclosure, the mobile device receives information about two touches of a user, and obtains positions of the two touches; determines to zoom the displayed content on the touchscreen according to the positions of the two touches, and determines zooming times according to a distance between the positions of the two touches. This resolves a problem in the prior art that a processing process is complex, and working efficiency is reduced when the mobile device controls to zoom the displayed content on the touchscreen. By resolving the foregoing technical problem, the mobile device only needs to sequentially receive the signals of the positions of the two touches to complete zoom in or zoom out control on the displayed content on the touchscreen. Operations are convenient, and the processing process is simple, which increases the working efficiency of the mobile device.

Figure 2A:
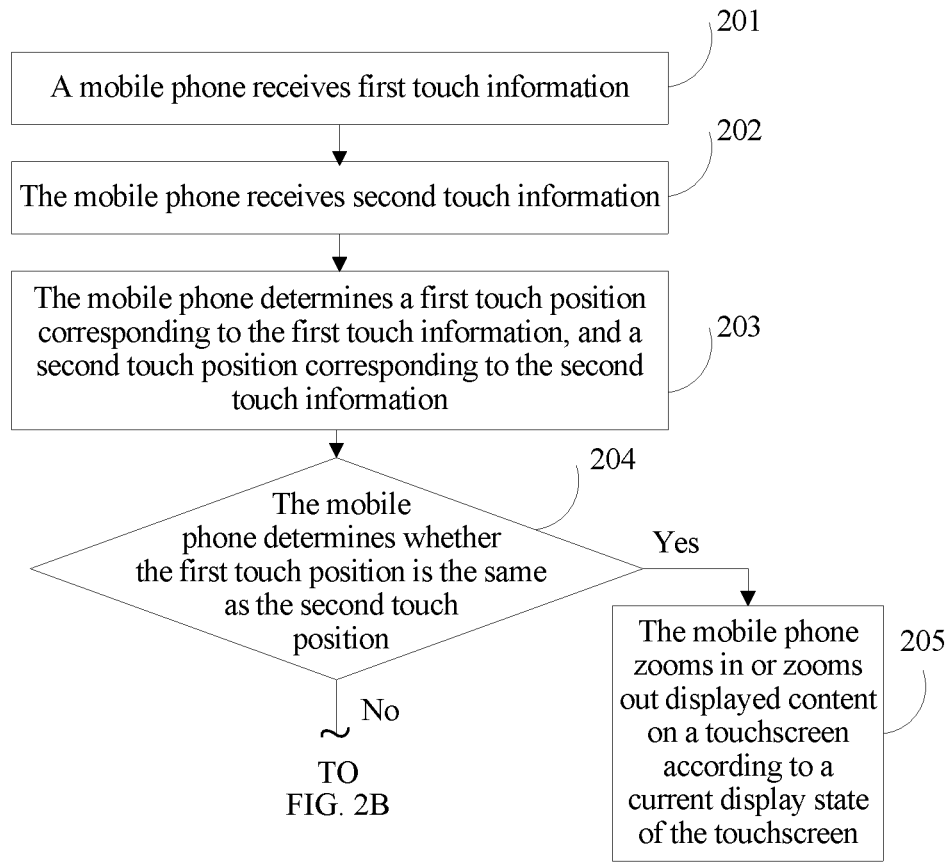
FIG. 2A and FIG. 2B are a flowchart of a method according to another embodiment of the present disclosure.
Figure 2B:
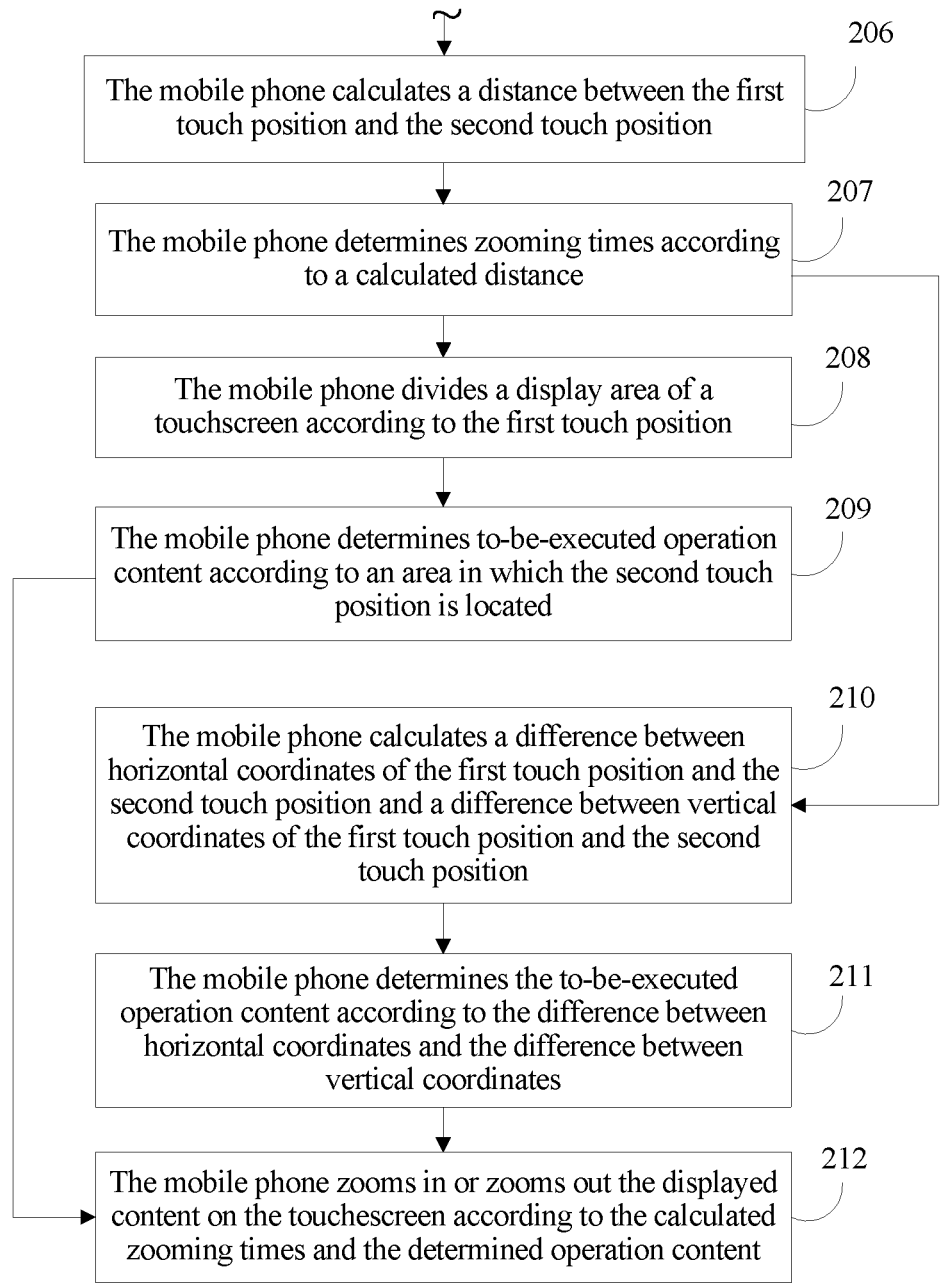

Another embodiment of the present disclosure provides a method for controlling display of a touchscreen of a mobile device, which is used in a mobile device. Using a mobile phone having a touchscreen as an example, as shown in FIG. 2A and FIG. 2B, the method includes the following steps:

201. The mobile phone receives first touch information.

For example, after a user taps the touchscreen, a corresponding touch sensor receives information about a current touch, including a position at which the user touches the touchscreen, which includes coordinates of the position on the touchscreen.

202. The mobile phone receives second touch information.

For example, after the user taps the touchscreen, the corresponding touch sensor receives information about a current touch, including a position at which the user touches the touchscreen, which includes coordinates of the position on the touchscreen.

It should be noted that, when the user needs to zoom displayed content on a screen, the zooming is implemented by touching the touchscreen of the mobile phone twice. A time interval between moments of the two taps on the touchscreen needs to be less than a preset time, and the mobile phone does not perform zooming when the time interval between the moments of the two touches is not less than the preset time. For example, if the preset time is 1 seconds, when the user zooms in or zooms out the displayed content on the touchscreen, an interval between the moments of the two taps on the touchscreen should be less than 1 seconds.

203. The mobile phone determines a first touch position corresponding to the first touch information, and a second touch position corresponding to the second touch information.

After the user taps the touchscreen twice, a central processing unit (CPU) of the mobile phone may acquire the coordinates of the touch positions from the touch sensor, so as to determine the positions of the two touches, which are respectively denoted as the first touch position and the second touch position.

204. The mobile phone determines whether the first touch position is the same as the second touch position, and if the first touch position is the same as the second touch position, perform step 205, or otherwise, perform step 206.

For example, after acquiring the coordinates of the two touch positions of the user, the CPU determines whether the coordinates of the two points are the same, where if the coordinates of the two points are the same, it indicates that the two touches occur in a same position, and step 205 is performed; or if the coordinates of the two points are different, it indicates that the two touches occur in different positions, and step 206 is performed.

205. The mobile phone zooms-in or zooms-out displayed content on the touchscreen according to a current display state of the touchscreen.

For example, when the user touches a same position twice, the mobile phone determines to-be-executed operation content according to the current display state of the touchscreen. If the touchscreen is in a zoomed-in state currently, the mobile phone performs a zoom-out operation to zoom-out current displayed content on the touchscreen to an original state; or if the touchscreen is in a zoomed-out state currently, the mobile phone performs a zoom-in operation to zoom-in the current displayed content on the touchscreen to the original state; or if the touchscreen is in the original state currently, the mobile phone performs a zoom-in operation to zoom-in the current displayed content on the touchscreen to a maximum state.

206. The mobile phone calculates a distance between the first touch position and the second touch position.

After acquiring the coordinates of the two touch positions, the mobile phone may calculate the distance between the two touch positions according to a distance formula for two points in a plane. For example, if the coordinates of the first touch position are (a, b), and the coordinates of the second touch position are (c, d), the distance is $\sqrt{(a-c)^2+(b-d)^2}$.

207. The mobile phone determines zooming times according to a calculated distance.

It should be noted that, a preset distance may be set in the mobile phone, where the preset distance is a minimum distance for distinguishing the first touch position and the second touch position as two different positions, and the calculated distance is greater than or equal to the preset distance.

After obtaining the distance between the two touch positions by calculation, the mobile phone calculates a ratio of the distance between the two touch positions to the preset distance, and an obtained ratio is the zooming times for zooming in or zooming out the content on the touchscreen.

Optionally, a correspondence between the distance between the two touch positions and the zooming times may be preset in the mobile phone; after obtaining the distance between the two touch positions by calculation, the mobile phone directly determines the zooming times according to the correspondence between the distance between the two touch positions and the zooming times; or after obtaining the distance between the two touch positions by calculation, the mobile phone determines a ratio of the distance between the two touch positions to horizontal coordinates of the two touch positions, or a ratio of the distance between the two touch positions to a difference between vertical coordinates of the two touch positions, and determines the ratio as the zooming times.

208. The mobile phone divides a display area of the touchscreen according to the first touch position.

The mobile phone determines, in the display area of the touchscreen according to the first touch position of the user, a boundary that passes the first touch position of the user, where a shape of the boundary may be preset. The boundary divides the touchscreen into two areas, which are respectively determined as a zoom-in area and a zoom-out area. The boundary is divided into two parts according to the first touch position of the user, where one part of the boundary corresponds to the zoom-in area, and the other part of the boundary corresponds to the zoom-out area.

Optionally, a virtual boundary may be preset on the touchscreen in the mobile phone according to use habits of most users. The boundary determined after the first touch of the user has a same variation trend with the virtual boundary.

Figure 3:
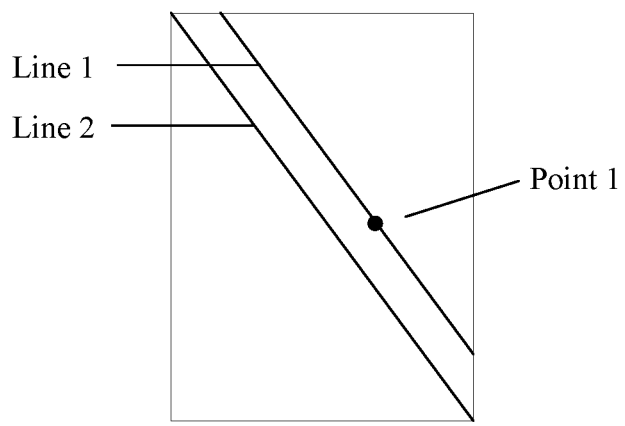
FIG. 3 is a schematic diagram of a display effect of a touchscreen according to still another embodiment of the present disclosure.

For example, on a screen of a touchscreen mobile phone shown in FIG. 3, a line 2 is a set virtual boundary, a point 1 is a first touch position of a user, and a line 1 is a boundary that is determined by the mobile phone and passes the point 1, where the boundary parallels to the virtual boundary. The boundary divides the touchscreen into two parts; in this embodiment of the present disclosure, it is set that a right side of the boundary and an upper side of the point 1 on the boundary are a zoom-in area, and a left side of the boundary and a lower side of the point 1 on the boundary are a zoom-out area.

Optionally, the mobile phone may further divide a display area of the touchscreen into four quadrants using the first touch position as an origin, where two quadrants in the four quadrants serve respectively as a first display area and a second display area.

209. The mobile phone determines to-be-executed operation content according to an area in which the second touch position is located.

After designating the boundary, the mobile phone determines a relationship between the second touch position of the user and the boundary, so as to determine the area in which the second touch position is located, and then determines the to-be-executed operation content according to the area in which the second touch position is located; and then step 212 is performed.

Figure 4:
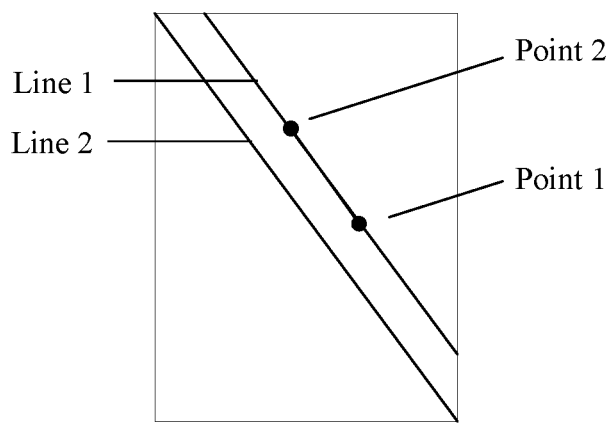
FIG. 4 is a schematic diagram of a display effect of a touchscreen according to still another embodiment of the present disclosure.
Figure 5:
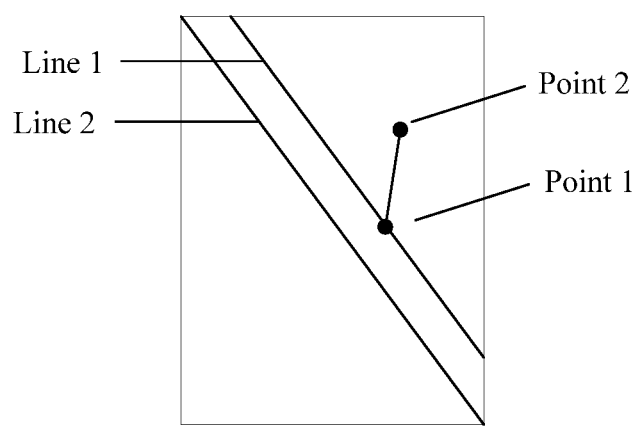
FIG. 5 is a schematic diagram of a display effect of a touchscreen according to still another embodiment of the present disclosure.
Figure 6:
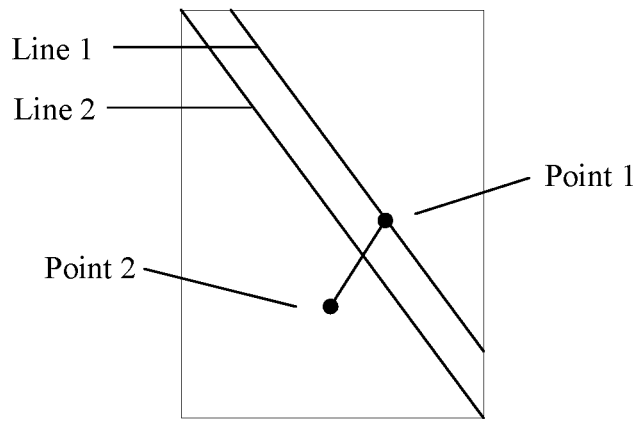
FIG. 6 is a schematic diagram of a display effect of a touchscreen according to still another embodiment of the present disclosure.

For example, on a screen of a touchscreen mobile phone shown in FIG. 4, a point 2 is the second touch position. As shown in FIG. 4, the point 2 is on the boundary and is located on the upper side of the point 1; it may be learned from the zoom-in area and zoom-out area determined in step 208 that, the point 2 is located in the zoom-in area, the mobile phone performs a zoom-in operation, and step 212 is performed. As shown in FIG. 5, a point 2 is located on the right side of the boundary; it may be learned from the zoom-in area and zoom-out area determined in step 208 that, the point 2 is located in the zoom-in area, the mobile phone performs a zoom-in operation, and step 212 is performed. As shown in FIG. 6, a point 2 is located on the left side of the boundary; it may be learned from the zoom-in area and zoom-out area determined in step 208 that, the point 2 is located in the zoom-out area, the mobile phone performs a zoom-out operation, and step 212 is performed.

Optionally, after the zooming times are obtained by calculation in step 207, methods described in step 210 and step 211 may be further performed to determine the to-be-executed operation content of the mobile phone.

210. The mobile phone calculates a difference between horizontal coordinates of the first touch position and the second touch position and a difference between vertical coordinates of the first touch position and the second touch position.

The difference between horizontal coordinates is calculated according to the horizontal coordinate of the first touch position and the horizontal coordinate of the second touch position, and the difference between vertical coordinates is calculated according to the vertical coordinate of the first touch position and the vertical coordinate of the second touch position.

211. The mobile phone determines the to-be-executed operation content according to the difference between horizontal coordinates and the difference between vertical coordinates.

For example, if the coordinates of the first touch position is (a, b), and the coordinates of the second touch position is (c, d), the difference between horizontal coordinates and the difference between vertical coordinates are calculated. When a−c≥0 and b−d≥0, a zoom-in operation is performed on the displayed content on the touchscreen; or when a−c≤0 and b−d≤0, a zoom-out operation is performed on the displayed content on the touchscreen; or when a−c≥0 and b−d≥0, a zoom-out operation is performed on the displayed content on the touchscreen; or when a−c≤0 and b−d≤0, a zoom-in operation is performed on the displayed content on the touchscreen; or when a−c<0 and b−d>0, a zoom-in operation is performed on the displayed content on the touchscreen; or when a−c>0 and b−d<0, a zoom-out operation is performed on the displayed content on the touchscreen; or when a−c>0 and b−d<0, a zoom-in operation is performed on the displayed content on the touchscreen; or when a−c<0 and b−d>0, a zoom-out operation is performed on the displayed content on the touchscreen.

212. The mobile phone zooms-in or zooms-out the displayed content on the touchscreen according to the calculated zooming times and the determined operation content.

The mobile phone uses the ratio calculated in step 207 as the zoom-in or zoom-out times, and zooms in the displayed content on the touchscreen according to the operation content determined in step 209 or step 211.

Optionally, the zoom-in or zoom-out performed by the mobile phone on the displayed content on the touchscreen may be wholly zoom-in or zoom-out, or partially zoom-in or zoom-out. Partially zooming in or zooming out the displayed content on the touchscreen may be zooming in or zooming out a circular display area that uses the first touch position or the second touch position as a center and uses a preset length as a radius; or zooming in or zooming out a display area of a closed graph that uses the first touch position or the second touch position as a center and uses a preset length as a circumference.

Figure 7:
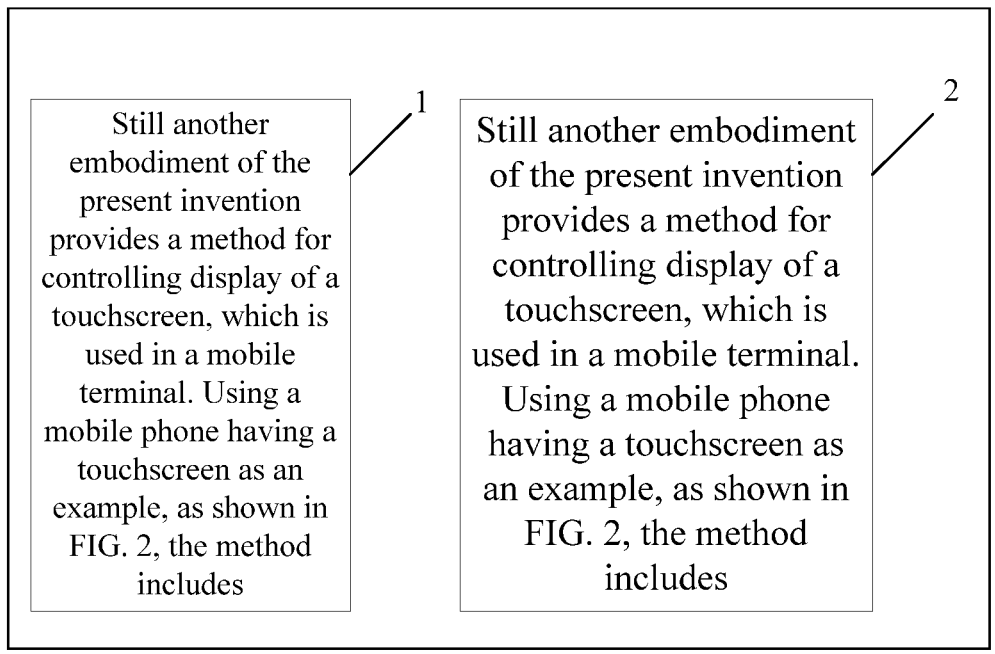
FIG. 7 is a schematic diagram of a display effect of a touchscreen according to still another embodiment of the present disclosure.
Figure 8:
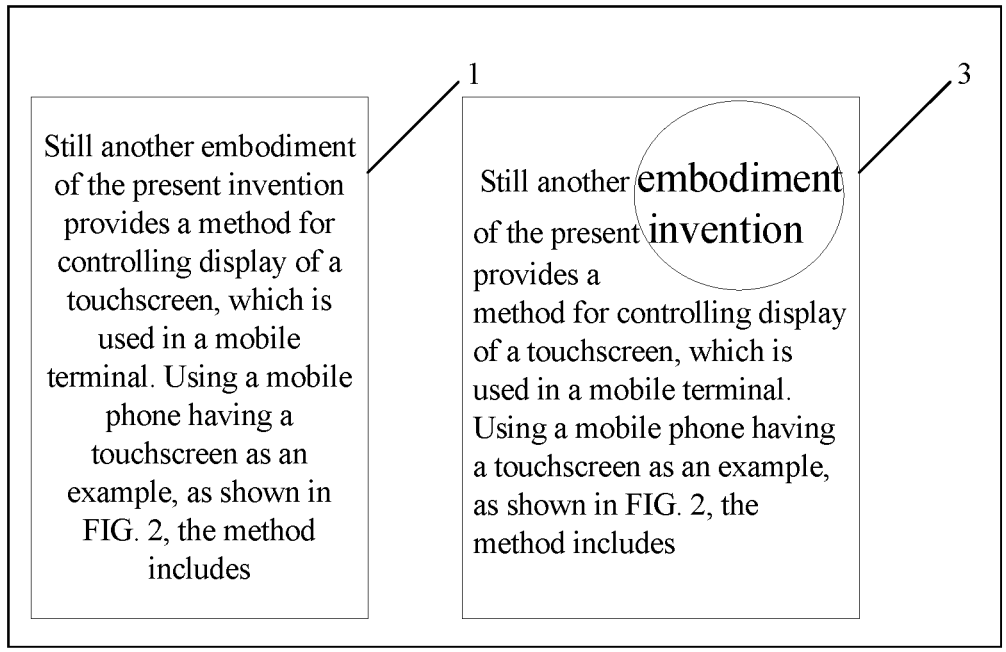
FIG. 8 is a schematic diagram of a display effect of a touchscreen according to still another embodiment of the present disclosure.

For example, as shown in FIG. 7, 1 is a state of original display on the screen of the mobile phone, and 2 is a state after the mobile phone wholly zooms in the displayed content on the touchscreen; as shown in FIG. 8, 1 is a state of original display on the screen of the mobile phone, and 3 is a state after the mobile phone partially zooms in the displayed content on the touchscreen.

In the prior art, a mobile phone needs to simultaneously receive signals of two touch points, and detect change status of the two signals to control to zoom-in or zoom-out displayed content on a touchscreen. Compared with the prior art, in this embodiment of the present disclosure, the mobile phone receives information about two touches of a user, and obtains positions of the two touches; determines to zoom in or zoom out the displayed content on the touchscreen according to the positions of the two touches, and determines zoom-in or zoom-out times according to a distance between the positions of the two touches. This resolves a problem in the prior art that a processing process is complex, and a reaction rate and working efficiency are reduced when the mobile phone controls to zoom-in or zoom-out the displayed content on the touchscreen. By resolving the foregoing technical problem, the mobile phone only needs to sequentially receive the signals of the positions of the two touches to complete zoom-in or zoom-out control on the displayed content on the touchscreen. Operations are convenient, and the processing process is simple, which increases working efficiency of a mobile device.

Figure 9:
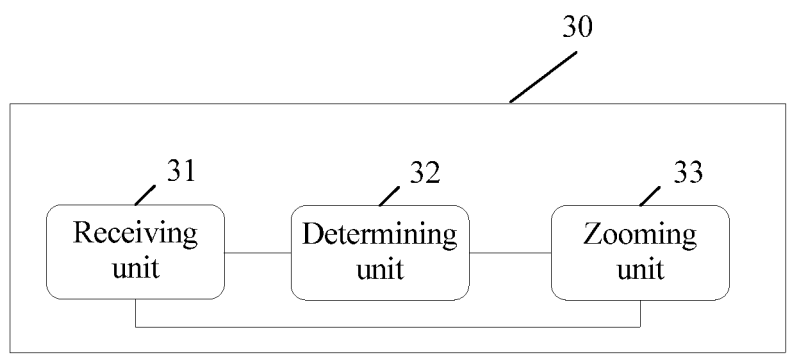
FIG. 9 and FIG. 10 are schematic structural diagrams of a mobile device according to still another embodiment of the present disclosure.

Still another embodiment of the present disclosure provides a mobile device 30 for controlling display of a touchscreen; as shown in FIG. 9, the mobile device 30 includes a receiving unit 31 configured to receive first touch information, where the first touch information includes a first touch position; where the receiving unit 31 is further configured to receive second touch information, where the second touch information includes a second touch position; a determining unit 32 configured to determine zooming times according to a distance between the first touch position and the second touch position; and a zooming unit 33 configured to zoom displayed content on the touchscreen according to a position relationship between the first touch position and the second touch position and the zooming times.

Figure 10:
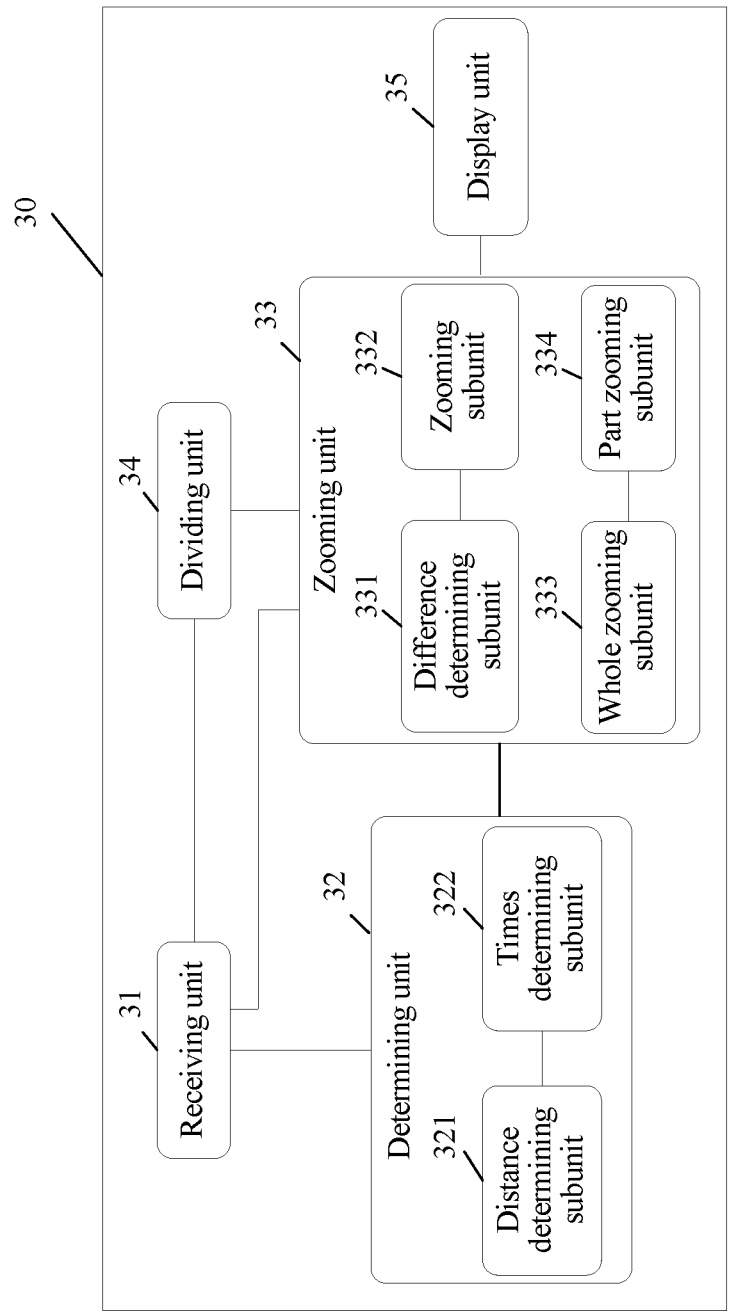

Further, as shown in FIG. 10, the mobile device 30 further includes a dividing unit 34 configured to divide a display area of the touchscreen into a first display area and a second display area according to the first touch position, where a boundary between the first display area and the second display area passes the first touch position; or the dividing unit 34, further configured to divide a display area of the touchscreen into four quadrants using the first touch position as an origin, where two quadrants in the four quadrants serve respectively as the first display area and the second display area.

The zooming unit 33 is configured to, when the second touch position is located in the first display area, zoom in the displayed content on the touchscreen according to the position relationship; or when the second touch position is located in the second display area, zoom out the displayed content on the touchscreen according to the position relationship.

Further, as shown in FIG. 10, the zooming unit 33 includes a difference determining subunit 331 configured to determine a first difference and a second difference according to coordinates of the first touch position and coordinates of the second touch position, where the first difference is a difference between a horizontal coordinate of the first touch position and a horizontal coordinate of the second touch position, and the second difference is a difference between a vertical coordinate of the first touch position and a vertical coordinate of the second touch position; and a zooming subunit 332 configured to zoom the displayed content on the touchscreen according to the first difference, the second difference, and the zooming times.

Further, the zooming subunit 332 is configured to, when both the first difference and the second difference are positive, zoom-in the displayed content on the touchscreen; or when both the first difference and the second difference are negative, zoom-out the displayed content on the touchscreen; or when both the first difference and the second difference are negative, zoom in the displayed content on the touchscreen; or when both the first difference and the second difference are positive, zoom-out the displayed content on the touchscreen.

Further, the zooming subunit 332 is configured to, when the first difference is positive and the second difference is negative, zoom-in the displayed content on the touchscreen; or when the first difference is negative and the second difference is positive, zoom-out the displayed content on the touchscreen; or when the first difference is negative and the second difference is positive, zoom-in the displayed content on the touchscreen; or when the first difference is positive and the second difference is negative, zoom-out the displayed content on the touchscreen.

Further, as shown in FIG. 10, the zooming unit 33 further includes a whole zooming subunit 333 configured to wholly zoom in the displayed content on the touchscreen; or a part zooming subunit 334 configured to partially zoom in the displayed content on the touchscreen.

Further, as shown in FIG. 10, the part zooming subunit 334 is configured to zoom-in or zoom-out a circular display area that uses the first touch position or the second touch position as a center and uses a preset length as a radius; or zoom a display area of a closed graph that uses the first touch position or the second touch position as a center and uses a preset length as a circumference.

Further, as shown in FIG. 10, the determining unit 32 includes a distance determining subunit 321 configured to determine the distance according to the coordinates of the first touch position and the coordinates of the second touch position; and a times determining subunit 322 configured to determine a ratio of the distance to a preset distance, and determine the ratio as the zooming times, where the distance is greater than or equal to the preset distance; or the times determining subunit 322, further configured to directly determine the zooming times according to the distance, where a correspondence between the distance and the zooming times is preset.

Further, as shown in FIG. 10, the mobile device 30 further includes a display unit 35 configured to display the displayed content that is zoomed by the zooming unit 33.

The preset distance is a minimum distance for distinguishing the first touch position and the second touch position as two different positions. A time interval between a moment for receiving the first touch information and a moment for receiving the second touch information is less than a preset time.

In the prior art, a mobile device needs to simultaneously receive signals of two touch points, and detect change status of the two signals to control to zoom in or zoom out displayed content on a touchscreen. Compared with the prior art, in this embodiment of the present disclosure, a mobile device 30 receives information about two touches of a user, and obtains positions of the two touches; determines to zoom-in or zoom-out the displayed content on the touchscreen according to the positions of the two touches, and determines zoom-in and zoom-out times according to a distance between the positions of the two touches. This resolves a problem in the prior art that a processing process is complex, and a reaction rate and working efficiency are reduced when the mobile device 30 controls to zoom-in or zoom-out the displayed content on the touchscreen. By resolving the foregoing technical problem, the mobile device 30 only needs to sequentially receive the signals of the positions of the two touches to complete zoom-in or zoom-out control on the displayed content on the touchscreen. Operations are convenient, and the processing process is simple, which increases the working efficiency of the mobile device 30.

Figure 11:
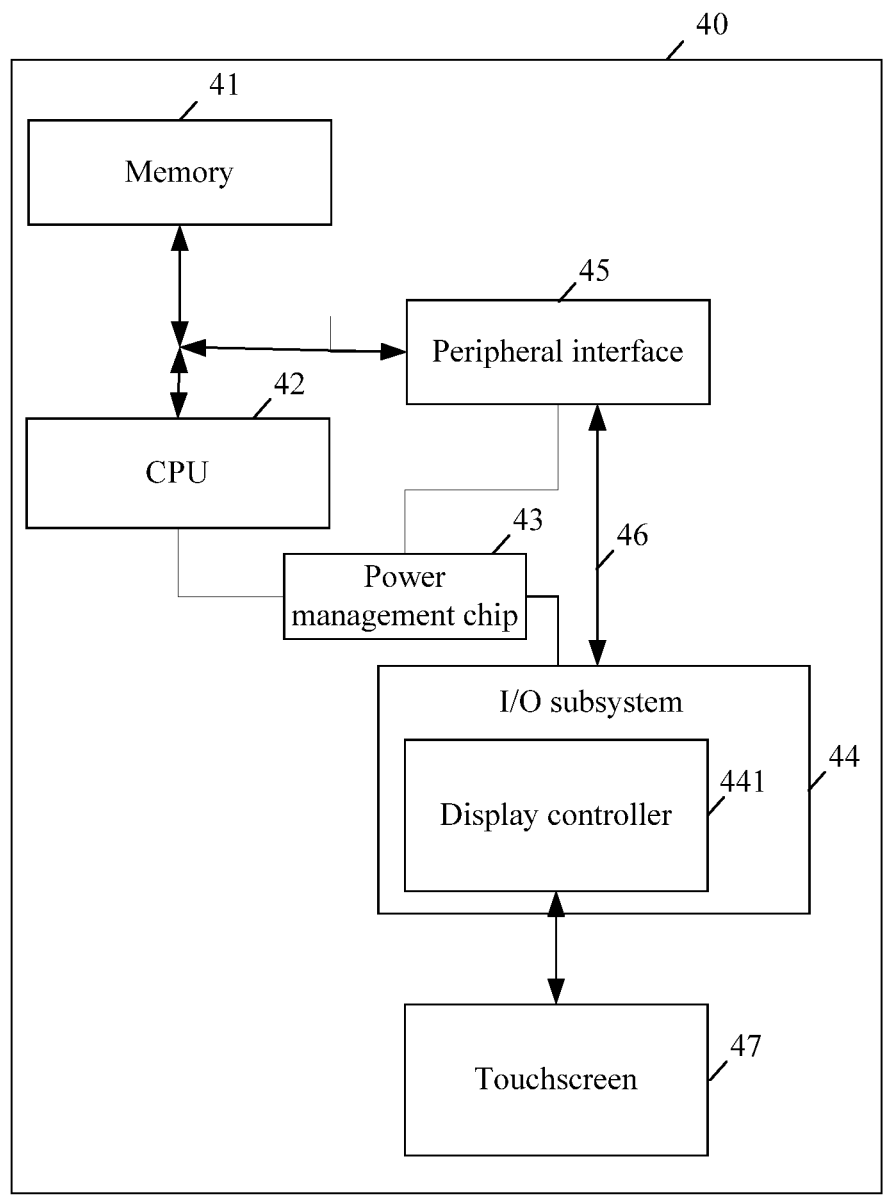
FIG. 11 is a schematic structural diagram of a mobile device according to still another embodiment of the present disclosure.

Still another embodiment of the present disclosure provides a mobile device for controlling display of a touchscreen; as shown in FIG. 11, a mobile phone is used as an example to describe the present disclosure in detail.

It should be understood that, a mobile phone 40 shown in the diagram is merely an example of the mobile device, and the mobile phone 40 may have more or less parts than those shown in FIG. 11, and may combine two or more parts or have different parts configurations. Various parts shown in FIG. 11 may be implemented in hardware including one or more signal processing and/or application-specific integrated circuits, in software, or in a combination of hardware and software.

Herein, the mobile phone is used as an example for specific description. FIG. 11 is a schematic structural diagram of an embodiment of a mobile phone for processing a message according to the present disclosure. As shown in FIG. 11, the mobile phone includes a memory 41, a CPU 42, a power management chip 43, an input/output (I/O) subsystem 44, and a peripheral interface 45; these components perform communications using one or more communications buses or a signal cable 46.

It should be noted that, the mobile phone provided in this embodiment of the present disclosure is merely an example of the mobile device; the mobile device involved in this embodiment of the present disclosure may have more or less parts than those shown in FIG. 11, may combine two or more parts, or may have different part configurations or settings. Various parts may be implemented in hardware including one or more signal processing and/or application-specific integrated circuits, in software, or in a combination of hardware and software.

The following describes in detail the mobile phone provided in this embodiment for processing a message.

Memory 41: The memory 41 may be accessed by the CPU 42, and the memory 41 may include a high-speed random access memory, and may further include a non-volatile memory, such as one or more magnetic disk storage devices, a flash device, or another volatile solid-state storage device.

I/O subsystem 44: The I/O subsystem 44 may connect an input or output peripheral of the device, such as a touchscreen 47, to the peripheral interface 45. The I/O subsystem 44 may include a display controller 441.

Touchscreen 47: The touchscreen 47 is an input interface and an output interface between the mobile device and a user, and may receive an instruction of the user in a touch form, and display visual output to the user.

The display controller 441 in the I/O subsystem 44 receives an electrical signal from the touchscreen 47 or sends an electrical signal to the touchscreen 47. The touchscreen 47 detects a touch on the touchscreen, and the display controller 441 converts the detected touch into interaction with a user interface object displayed on the touchscreen 47, that is, implements human-machine interaction, where the user interface object displayed on the touchscreen 47 may be an icon for running a game, an icon for linking to the Internet, and the like. It should be noted that, the device further includes an optical mouse, where the optical mouse is a touch sensitive surface that does not display the visual output, or an extension of a touch sensitive surface formed by the touchscreen.

The power management chip 43 is configured to supply power to and perform power management on the CPU 42, the I/O subsystem 44, and the hardware that is connected to the peripheral interface 45.

The touchscreen 47 receives first touch information and second touch information, where the first touch information includes a first touch position, and the second touch information includes a second touch position; the I/O subsystem 44 and the peripheral interface 45 transmit the first touch information and the second touch information to the CPU 42; the CPU 42 determines zooming times according to a distance between the first touch position and the second touch position, and zooms displayed content on the touchscreen 47 according to a position relationship between the first touch position and the second touch position and the zooming times.

The preset distance is a minimum distance for distinguishing the first touch position and the second touch position as two different positions. A time interval between a moment for receiving the first touch information and a moment for receiving the second touch information is less than a preset time.

Further, the CPU 42 divides a display area of the touchscreen 47 into a first display area and a second display area according to the first touch position included in the first touch information received by the touchscreen 47, where a boundary between the first display area and the second display area passes the first touch position; or the CPU 42 divides a display area of the touchscreen 47 into four quadrants using the first touch position as an origin, where two quadrants in the four quadrants serve respectively as a first display area and a second display area.

When the second touch position is located in the first display area, the CPU 42 zooms in the displayed content on the touchscreen according to the position relationship; or when the second touch position is located in the second display area, the CPU 42 zooms-out the displayed content on the touchscreen according to the position relationship.

Further, the CPU 42 determines a first difference and a second difference according to coordinates of the first touch position and coordinates of the second touch position, where the first difference is a difference between a horizontal coordinate of the first touch position and a horizontal coordinate of the second touch position, and the second difference is a difference between a vertical coordinate of the first touch position and a vertical coordinate of the second touch position; and the CPU 42 zooms the displayed content on the touchscreen 47 according to the first difference, the second difference, and the zooming times.

When both the first difference and the second difference are positive, the CPU 42 zooms-in the displayed content on the touchscreen 47; or when both the first difference and the second difference are negative, the CPU 42 zooms-out the displayed content on the touchscreen 47; or when both the first difference and the second difference are negative, the CPU 42 zooms-in the displayed content on the touchscreen 47; or when both the first difference and the second difference are positive, the CPU 42 zooms-out the displayed content on the touchscreen 47.

Further, when the first difference is positive and the second difference is negative, the CPU 42 zooms-in the displayed content on the touchscreen 47; or when the first difference is negative and the second difference is positive, the CPU 42 zooms-out the displayed content on the touchscreen 47; or when the first difference is negative and the second difference is positive, the CPU 42 zooms-in the displayed content on the touchscreen 47; or when the first difference is positive and the second difference is negative, the CPU 42 zooms-out the displayed content on the touchscreen 47.

Optionally, the CPU 42 wholly zooms-in the displayed content on the touchscreen 47; or the CPU 42 partially zooms-in the displayed content on the touchscreen 47.

Further, the CPU 42 zooms a circular display area that uses the first touch position or the second touch position as a center and uses a preset length as a radius; or the CPU 42 zooms a display area of a closed graph that uses the first touch position or the second touch position as a center and uses a preset length as a circumference.

Optionally, the CPU 42 determines the distance according to the coordinates of the first touch position and the coordinates of the second touch position.

Further, the CPU 42 determines a ratio of the distance to a preset distance, and determines the ratio as the zooming times, where the distance is greater than or equal to the preset distance; or the CPU 42 directly determines the zooming times according to the distance, where a correspondence between the distance and the zooming times is preset.

In the foregoing embodiment, the CPU 42 may be a Pentium series processor or an Itanium processor manufactured by Intel Corporation.

In the foregoing embodiment of the present disclosure, the mobile device includes but is not limited to a mobile communications device, such as a mobile phone, a personal digital assistant (PDA), and a tablet computer.

In the prior art, a mobile phone needs to simultaneously receive signals of two touch points, and detect change status of the two signals to control to zoom-in or zoom-out displayed content on a touchscreen. Compared with the prior art, in this embodiment of the present disclosure, a mobile phone 40 receives information about two touches of a user, and obtains positions of the two touches; determines to zoom the displayed content on the touchscreen according to the positions of the two touches, and determines zooming times according to a distance between the positions of the two touches. This resolves a problem in the prior art that a processing process is complex, and a reaction rate and working efficiency are reduced when the mobile phone controls to zoom-in or zoom-out the displayed content on the touchscreen. By resolving the foregoing technical problem, the mobile phone 40 only needs to sequentially receive the signals of the positions of the two touches to complete zoom-in or zoom-out control on the displayed content on the touchscreen. Operations are convenient, and the processing process is simple, which increases the working efficiency of the mobile phone 40.

A mobile device for controlling display of a touchscreen according to embodiments of the present disclosure can implement the foregoing provided method embodiments. For detailed function implementation, reference may be made to descriptions in the method embodiments, and details are not described herein again. A method for controlling display of a touchscreen and a mobile device that are provided in the embodiments of the present disclosure can be applicable to a mobile device, but are not limited thereto.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory, a random access memory, or the like.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A mobile device, comprising:
    a touchscreen;
    one or more processors coupled to the touchscreen; and
    a memory coupled to the one or more processors and configured to store programming for execution by the one or more processors, wherein when executed by the one or more processors, the programming is configured to cause the one or more processors to:
        receive first touch information comprising a first touch position;
        receive second touch information comprising a second touch position;
        determine whether the first touch position is the same as the second touch position;
        zoom displayed content on the touchscreen according to a current display state of the touchscreen when the first touch position is the same as the second touch position;
        when the first touch position is not the same as the second touch position:
            calculate a distance between the first touch position and the second touch position;
            determine zooming times according to the calculated distance; and
            display the displayed content on the touchscreen according to the zooming times.

2. The mobile device of claim 1, wherein the programming is configured to cause the one or more processors to zoom the displayed content on the touchscreen according to the current display state of the touchscreen by causing the one or more processors to be configured to:
    perform a zoom-out operation to zoom-out current displayed content on the touchscreen to an original state when the touchscreen is in a zoomed-in state;
    perform a zoom-in operation to zoom-in the current displayed content on the touchscreen to the original state when the touchscreen is in a zoomed-out state; or
    perform the zoom-in operation to zoom-in the current displayed content on the touchscreen to a maximum state when the touchscreen is in the original state.

3. The mobile device of claim 1, wherein the programming is configured to cause the one or more processors to display the displayed content on the touchscreen according to the zooming times by causing the one or more processors to:
    divide a display area of the touchscreen into a first display area and a second display area according to the first touch position, wherein a boundary between the first display area and the second display area passes the first touch position;
    zoom in the displayed content on the touchscreen according to a position relationship when the second touch position is located in the first display area; and
    zoom out the displayed content on the touchscreen according to the position relationship when the second touch position is located in the second display area.

4. The mobile device of claim 1, wherein the programming is configured to cause the one or more processors to display the displayed content on the touchscreen according to the zooming times by causing the one or more processors to wholly zoom in the displayed content on the touchscreen.

5. The mobile device of claim 1, wherein the programming is configured to cause the one or more processors to display the displayed content on the touchscreen according to the zooming times by causing the one or more processors to partially zoom in the displayed content on the touchscreen.

6. The mobile device of claim 5, wherein the programming is configured to cause the one or more processors to partially zoom in the displayed content on the touchscreen by causing the one or more processors to zoom in a circular display area that uses the first touch position or the second touch position as a center and uses a preset length as a radius.

7. The mobile device of claim 5, wherein the programming is configured to cause the one or more processors to partially in the displayed content on the touchscreen by causing the one or more processors to zoom in a display area of a closed graph that uses the first touch position or the second touch position as a center and uses a preset length as a circumference.

8. The mobile device of claim 1, wherein the programming is configured to cause the one or more processors to calculate the distance according to coordinates of the first touch position and the coordinates of the second touch position, and wherein the programming is configured to cause the one or more processors to determine the zooming times according to the calculated distance by causing the one or more processors to:
    determine the zooming times using a ratio at least in part by:
        determining the ratio of the calculated distance to a preset distance; and
        set the ratio as the zooming times or
    determine the zooming times according to the calculated distance when a correspondence between the calculated distance and the zooming times is preset.

9. The mobile device of claim 8, wherein the preset distance is a minimum distance for distinguishing the first touch position and the second touch position as two different positions.

10. The mobile device of claim 1, wherein a time interval between a moment at which the first touch information is received and a moment at which the second touch information is received is less than a preset time.

11. A method for controlling display of a touchscreen of a mobile device, implemented by the mobile device, the method comprising:
    receiving first touch information comprising a first touch position;
    receiving second touch information comprising a second touch position;
    determining whether the first touch position is the same as the second touch position;

zooming displayed content on the touchscreen according to a current display state of the touchscreen when the first touch position is the same as the second touch position;

when the first touch position is not the same as the second touch position:

calculating a distance between the first touch position and the second touch position;

determining zooming times according to the calculated distance; and displaying the displayed content on the touchscreen according to the zooming times.

12. The method of claim 11, wherein zooming the displayed content on the touchscreen according to the current display state of the touchscreen comprises:

performing a zoom-out operation to zoom-out current displayed content on the touchscreen to an original state when the touchscreen is in a zoomed-in state;

performing a zoom-in operation to zoom-in the current displayed content on the touchscreen to the original state when the touchscreen is in a zoomed-out state; or performing the zoom-in operation to zoom-in the current displayed content on the touchscreen to a maximum state when the touchscreen is in the original state.

13. The method of claim 11, wherein displaying the displayed content on the touchscreen according to the zooming times comprises:

dividing a display area of the touchscreen into a first display area and a second display area according to the first touch position, wherein a boundary between the first display area and the second display area passes the first touch position;

zooming in the displayed content on the touchscreen according to a position relationship when the second touch position is located in the first display area; and zooming out the displayed content on the touchscreen according to the position relationship when the second touch position is located in the second display area.

14. The method of claim 11, wherein displaying the displayed content on the touchscreen according to the zooming times comprises wholly zooming in the displayed content on the touchscreen.

15. The method of claim 11, wherein displaying the displayed content on the touchscreen according to the zooming times comprises partially zooming in the displayed content on the touchscreen.

16. The method of claim 15, wherein partially zooming in the displayed content on the touchscreen comprises zooming in a circular display area that uses the first touch position or the second touch position as a center and uses a preset length as a radius.

17. The method of claim 15, wherein partially zooming in the displayed content on the touchscreen comprises zooming in a display area of a closed graph that uses the first touch position or the second touch position as a center and uses a preset length as a circumference.

18. The method of claim 11, wherein calculating the calculated distance comprises calculating the calculated distance according to coordinates of the first touch position and coordinates of the second touch position, and wherein determining the zooming times according to the calculated distance comprises:

determining the zooming times based on a ratio by:
    determining a ratio of the calculated distance to a preset distance; and
    setting the ratio as the zooming times; or determining the zooming times according to the calculated distance when a correspondence between the calculated distance and the zooming times is preset.

19. The method of claim 18, wherein the preset distance is a minimum distance for distinguishing the first touch position and the second touch position as two different positions.

20. The method of claim 11, wherein a time interval between a moment at which the first touch information is received and a moment at which the second touch information is received is less than a preset time.

* * * * *

UNITED STATES PATENT AND TRADEMARK OFFICE
CERTIFICATE OF CORRECTION

PATENT NO. : 10,514,802 B2
APPLICATION NO. : 16/229792
DATED : December 24, 2019
INVENTOR(S) : Jinfeng Zhou et al.

Page 1 of 1

It is certified that error appears in the above-identified patent and that said Letters Patent is hereby corrected as shown below:

On the Title Page

Page 2, Related U.S. Application Data: "15/101,531, filed as application No. PCT/CN2013/088690 on Dec. 5, 2013, now Pat. No. 10,025,420" should read "15/101,531, filed on June 3, 2016, now Pat. No. 10,025,420, which is a continuation of International Patent Application No. PCT/CN2013/088690, filed on Dec. 5, 2013."

Signed and Sealed this
Third Day of March, 2020

Andrei Iancu
*Director of the United States Patent and Trademark Office*